United States Patent [19]
Brüschke et al.

[11] Patent Number: 5,437,796
[45] Date of Patent: Aug. 1, 1995

[54] PLATE MODULE AND ITS USE FOR SEPARTING FLUID MIXTURES

[76] Inventors: Hartmut E. A. Brüschke, Kurpfalzstrasse 64, 6907 Nussloch; Raif Abouchar, Feldmannstrasse 7, 6600 Saarbrücken; Hartmut Ganz, Bexbacherstrasse 38, 6680 Neunkirchen, all of Germany; Joel Huret, 55, rue des Melezes, 57070 Metz-Vallières, France; Frank Marggraff, Ehrlichstrasse 9, 6650 Bad Homburg, Germany

[21] Appl. No.: 94,966

[22] Filed: Jul. 22, 1993

[30] Foreign Application Priority Data

Jul. 29, 1992 [DE] Germany .......................... 42 25 060.9

[51] Int. Cl.⁶ ............................................. B01D 61/36
[52] U.S. Cl. .................................... 210/640; 210/226; 210/228; 210/321.75; 210/321.84; 210/456
[58] Field of Search ................................ 210/226–228, 210/640, 450, 445, 321.75, 321.84, 232, 456

[56] References Cited

U.S. PATENT DOCUMENTS

| | | | |
|---|---|---|---|
| 3,256,174 | 6/1966 | Chen et al. | 210/321.84 |
| 3,398,091 | 8/1968 | Greatorex | 210/640 |
| 3,520,803 | 7/1970 | Iaconelli | 210/640 |
| 4,769,140 | 9/1988 | van Dijk et al. | 210/321.75 |

*Primary Examiner*—Matthew O. Savage
*Attorney, Agent, or Firm*—Banner & Allegretti, Ltd.

[57] ABSTRACT

A plate module and its use for separating fluid mixtures according to the methods of pervaporation and vapor permeation is comprised of a feed plate, a cover plate, a gasket, and a membrane to define at least one feed compartment and one permeate compartment. The feed compartment is connected to supply and removal ducts. The feed plate is formed as a single plate with no welding or deformation. Changes in the feed plate and distribution ducts can be easily effected without additional costs.

7 Claims, 3 Drawing Sheets

PLATE MODULE AND ITS USE FOR SEPARTING FLUID MIXTURES

The invention relates to a plate module and its use for the separation of fluid mixtures according to the methods of pervaporation and vapor permeation.

The methods of pervaporation and vapor permeation for separating fluid mixtures are known. That is, the mixture to be separated is contacted as liquid (pervaporation) or vapor (vapor permeation) with one side (feed side) of a pore-free membrane. Suitable membranes show a high permeation capability (permeability) for at least one component of the mixture, whereas other components will not pass or only pass to a limited extent. The driving force for the transport across the membrane is the gradient of the partial pressure of the better permeating component between the feed side and the permeate side of the membrane. At the permeate side one obtains under reduced pressure a material stream having a composition different from that of the mixture at the feed side to be separated. The methods of pervaporation and vapor permeation can thus advantageously be used to separate otherwise difficult to separate mixtures (such as azeotropic mixtures or components having similar boiling points).

For practicing the methods of pervaporation and vapor permeation in industrial scale suitable membranes are used in membrane modules which have to meet various requirements as follows:

a reliable sealing between the feed side and the permeate side of the membrane must be given.

the module must resist the operation conditions of the process, in particular in terms of pressure, temperature and chemical attack of the mixtures to be separated.

membrane surface areas as large as possible are to be installed in small space.

the mixture to be separated should stream over the membrane at the feed side steadily and with minimum pressure loss.

the vaporous permeate should be removed from the permeate side steadily and with minimum pressure loss.

the module should be producible under commercially acceptable conditions.

Plate modules for the use in pervaporation and vapor permeation processes are known (U.S. Pat. Nos. 2,958,656, 2,958,657, 3,182,043, 3,367,787, 3,140,256, 3,520,803). None of the suggestions made has, however, found its way into practical use. Furthermore, plate modules are known which have been suggested for dialysis or ultrafiltration (U.S. Pat. No. 3,256,174 and German Patent Publications 3 127 548 and 3 505 792) or for membrane distillation (German Patent Publication 3 312 359). All those suggestions have in common that a first plate is used for supporting the membrane as support of a gasket separating the feed side of the membrane from the permeate side of the membrane. A second plate forms a permeate compartment with the gasket and the permeate side, wherein liquid permeate is circulating in said permeate compartment. These modules are unsuitable for the methods of pervaporation and vapor permeation. EP-A-0 231 558 describes a module for use in pervaporation processes, which module comprises a stack of commercial platines of plate heat exchangers. The complicated shaping of these plates and their adaption for forming feed and permeate compartment adds, however, to the costs of the module. Changes in the streaming conditions at the feed and permeate sides are not possible but through change in the plate shaping, and the vaporous permeate has to be passed in a channel through the whole stack resulting in increased pressure losses.

U.S. Pat. No. 4,769,140 discloses a module for pervaporation and vapor permeation processes. In this module a feed plate is used which is formed by contacting, connecting, and sealing two indentical shaped plates, which comprise recesses and openings. These two plates are contacted at two identical, each other facing first sides and sealed together, e.g. by gluing, welding, or sealing material, in order to form supply and removal ducts for the mixture to be separated. On the outer, second sides of the thus formed feed plate gaskets and flat membranes are attached. These second sides of said feed plate, the gaskets, and a first side of the membrane form two identical feed compartments. The two feed compartments thus formed on the two outer sides of said feed plate are connected hydraulically with each other and with the supply and removal ducts. At the second sides of the membranes means are provided for the removal of the permeate comprising perforated plates and means for forming an open permeate duct in between. A multiplicity of feed plates, having gaskets and membranes at their second sides are alternatingly combined with perforated plates and means for the formation of permeate ducts. Such a multiplicity is held together by endplates and set bolts and forms the module. Through supply ducts the mixture to be separated is flowing between a membrane and a second side of a feed plates; the permeate passing through the membrane passes through the perforated plates and leaves the module via the permeate duct. Preferentially the module is of a square cross-section. The permeate ducts are open over nearly the whole periphery of the module, and the maximum passage for the permeate is equal to haft of the side-length of the modul cross-section.

Although permeate removal in a module according to U.S. Pat. No. 4,769, 140 satisfies the necessary requirements, it has been found that the feed plate is not satisfying. The shaped plates, which are combined to form the feed plate are deformed by pressing or deep drawing. Any modification necessary to adapt the feed plate to modified operation conditions requires high costs for changes of the respective mould. Sealing of the single plates forming the feed plate against each other is difficult. Through any leakage unseparated feed can enter into the permeate compartment and the sealing of supply ducts for the feed against the permeate compartment requires several different gaskets. Uniform flow of the feed mixture over the feed side cannot be guaranteed and dead zones may be formed.

The single plates forming said feed plates are preferentially connected by welding. The inavoidable heat input may lead to an uncontrollable deformation of the plates, resulting in the formation of channels through which the feed mixture is preferentially flowing, whereby substantial parts of the membrane are no longer effective for separation.

It is the scope of the present invention to overcome the shortcomings of the state-of-art and provide an improved module.

The present invention therefore relates to a plate module according to claim 1, and a feed plate for said plate module, according to claim 8. The present invention additionally relates to the use of a plate module for the separation of fluid mixtures by pervaporation and vapor permeation processes, according to claim 10.

The feed plate of the module of the present invention comprises a single plate. Thus no welding is required and any deformation of the plate is avoided. The feed plate is flat and not shaped, no costly moulds are necessary. Changes in dimensions of the feed plate, of the shape or size of the distributing ducts or the distances between feed plate and membrane are easily effected without additional costs. Thus the feed plate can easily be adapted to the requirements of a specific separation problem. Difficulties with sealing between single plates, as experienced in the state-of-art do not exist.

Distribution ducts, required for supply and removal of the mixture to be separated are cut into the feed plate and sealed to the outside by cover plates and a gasket. Only one uniform gasket is used.

DETAILED DESCRIPTION OF THE INVENTION

Following the drawings the module of the present invention is described.

Figure 1:
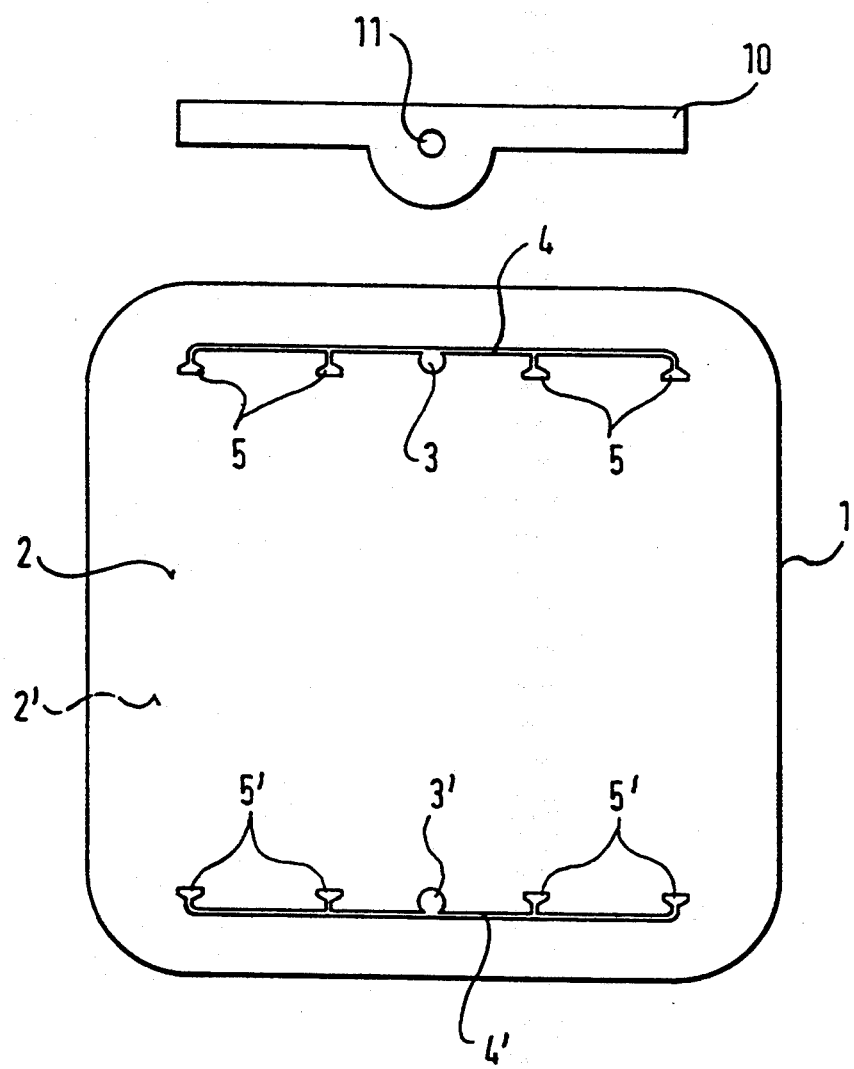
Figure 2:
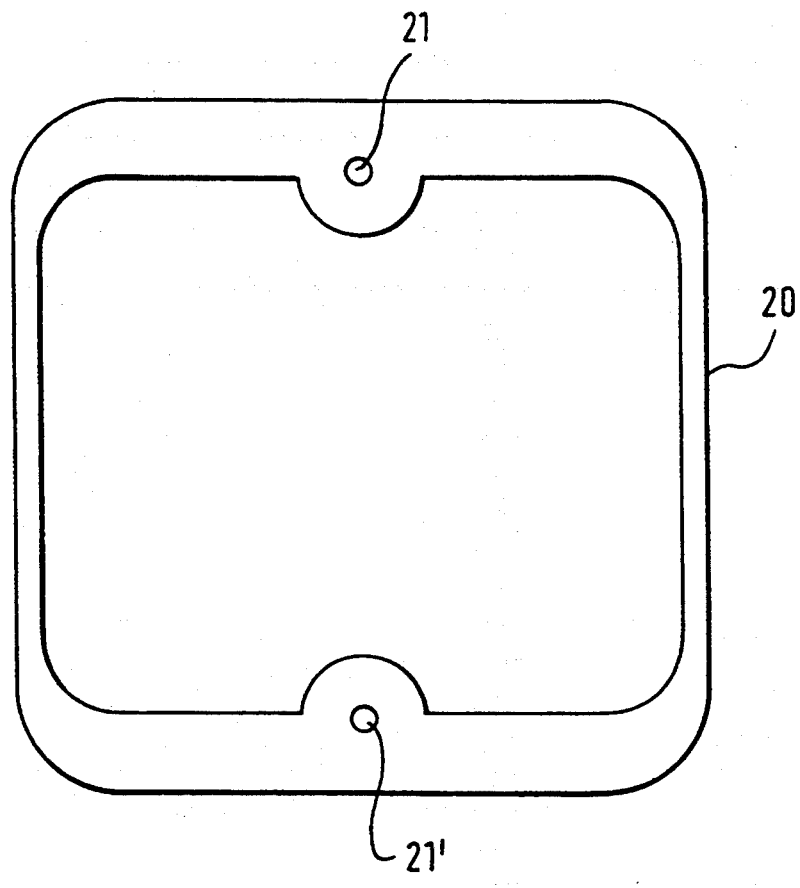
Figure 3:
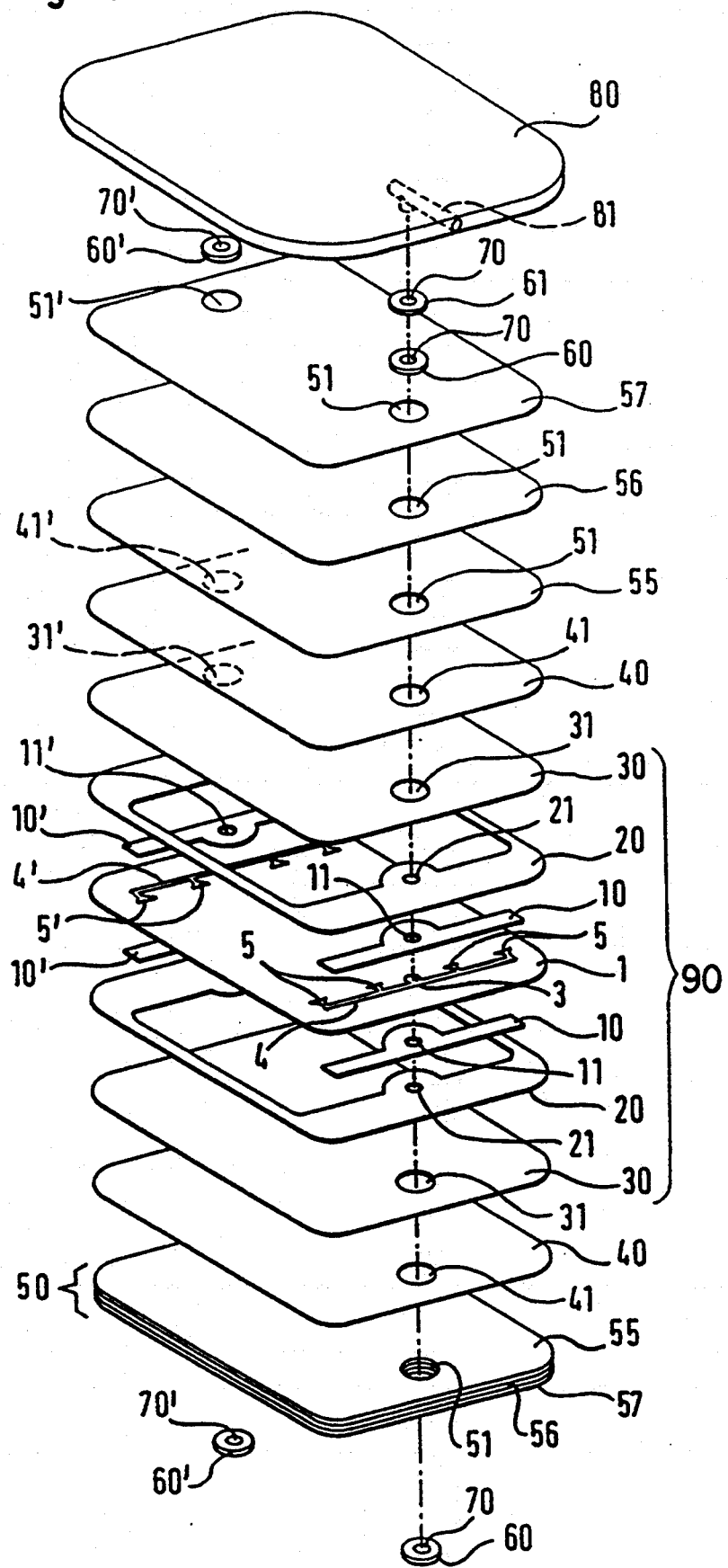

FIG. 1 shows a feed plate according to the invention
FIG. 2 shows a gasket for the feed plate of FIG. 1
FIG. 3 shows on explosion drawing of a module of the present invention According to FIG. 1 the feed plate of the present invention is a flat and even plate having an upper side 2 and lower side 2' (not visible on the drawing). The plate is made from any solid material, e.g. metal, plastic, ceramics, or graphite, stainless steel being the preferred material. The thickness of the plate depends on the kind of material and the operation conditions; preferred are thicknesses between 0.5 to 10 mm, with especially preferred thicknesses between 1 to 5 min. A square shape of the plate in preferred, but other shapes e.g. circular, oval, or rectangular may be used as well.

At two opposite sides the feed plate 1 has each an opening 3,3' with a distribution duct 4,4' which is connected to outlets 5,5'. Opening 3,3', distribution ducts 4,4', and outlets 5,5' can be cut into the plate 1 by any means known to those skilled in the art. For metal plates cutting by means of laser or plasma is preferred.

The distribution ducts 4,4' are covered on both sides 2,2' of the feed plate 1 by cover plates 10,10' (only 10 visible in FIG. 1). These cover plates 10,10' may be of the same or a different material as the feed plate 1. Stainless steel is the preferred material for the cover plates 10,10'. Preferentially the thickness of the cover plates is between 0.05 to 1 mm, thicknesses of 0.1 to 0.3 mm are especially preferred. Cover plates 10,10' have each an opening 11,11' which coincide with the each respective openings 3,3' in the feed plate 1. When the cover plate 10 is placed on the plate 1, it covers the distribution duct 4 in such a way that only opening 3, coinciding with opening 11 and outlets 5 remain open.

On the upper side 2 of the feed plate 1, which is provided with cover plates 10,10' a gasket 20 (FIG. 2) is placed, the same is done on to the lower side 2' of the feed plate 1. Outer dimensions of the gasket 20 coincide with those of the feed plate 1, the gasket 20 is provided with two openings 21, 21', which coincide with opening 3,3' of the feed plate 1 and openings 11,11' of the cover plates. On those sides of the gasket 20 which are provided with opening 21,21' the gasket coincides with its inner dimensions with the cover plates 10,10', and leaves only outlets 5,5' open.

Gasket 20 can be made by any sealing material known to those skilled in the art, due to their resistance silicone rubber, EPDM, Viton and PTFE are preferred and flexible graphite is especially preferred. The thickness of the gasket 20 depends on the material used and on the operation conditions. Thicknesses can vary between 0.5 to 10 mm, 1 mm to 3 mm being preferred thicknesses. Cover plates 10,10' prevent the intrusion of gasket 20 into the distribution ducts 4,4'.

As apparent from FIG. 3 on each the upper side 2 and the lower side 2' of the feed plate 1, provided with cover plates 10,10' and gasket 20 a membrane 30 is placed in such a way that a first side (feed side) of membrane 30 is facing the feed plate 1. A feed compartment 90 is formed by a feed plate 1, cover plates 10, 10', gaskets 20, and a first surface (feed surface) of membranes 30. On two opposite sides membrane 30 has openings 31, 31' which are concentric to openings 3,3' of the feed plate 1, 11,11' of the cover plates 10,10', and 21,21,' of gasket 20, but have a larger diameter. The second side of membrane 30 (not facing feed plate 1) is in contact with a drainage fabric 40, followed by a first perforated plate 55, a spacer 56 and a second perforated plate 57.

Drainage fabric 40, first perforated plate 55, spacer 56 and second perforated plate 57 each are provided with openings 41,41', 51,51', which are identical and coincide with opening 31,31' of membrane 30. The outer dimensions of gasket 20, membrane 30, drainage fabric 40, perforated plates 55, 57, and spacer 56 are identical to those of feed plate 1. Into the openings 31,31' of membrane 30; 41,41' of drainage fabric 40; 51,51' of the perforated plates 55,57; and 51,51' of the spacer, rings 60,60' are inserted, which have the same outer diameter as said openings 31,31'; 41,41'; 51,51'. The inner diameter of rings 60,60' is equal to the diameter of openings 21,21' of gasket 20; 11,11' of cover plates 10,10'; and openings 3,3' of feed plate 1. Rings 60,60' are in contact and sealed against gasket 20, the internal lumen of saids rings 60,60' forms supply and removal ducts 70,70' for the mixture to be separated. Through distribution ducts 4,4' and outlets 5,5' in feed plate 1, said supply and removal ducts 70,' are in contact with the feed side 1 of membrane 30. Permeate passing through membrane 30 flows through the drainage fabric 40 into a permeate compartment 50 formed by perforated plates 55,57 and spacer 56 and leaves the permeate compartment 50 over the whole periphery of the module.

End flanges 80,80' (only 80 slown in FIG. 3), provided with inlet or outlet 81 for the fluid mixture to be separated, and set bolts (not shown) keep 80,80' additional gasket rings 61,61' are used, the inner and outer diameter of which coincides with the inner and outer diameter of ting 60,60'.

In a preferred embodiment feed plates 1 are provided at the outer edge with distant limiters (not shown in the figures) which limit the maximum compression of gasket 20. In this embodiment the outer dimension of gasket 20 are smaller than the outer dimensions of feed plate 1, and the gasket 20 in placed within the limiters on feed plate 1. To those skilled in the art different limiters are known, e.g. U-shaped profiles, attached to the outside edges of feed plate 1.

In a further preferred embodiment feed plate 1 comprises more than one opening 3,3' on opposing sides. The number of distribution ducts 4,4' and outlets 5,5' is increased respectively.

In a further preferred embodiment, geometry and shape of distribution ducts 4,4' and outlets 5,5' are arranged in such a way to guarantee a uniform flow of the mixture to be separated over the feed side of the membrane, avoiding dead zones and minimizing pressure losses.

In a further preferred embodiment the apparatus includes a multiplicity of feed compartments and permeate compartments alternatingly arranged in a stack, held together by set bolts and flanges (80). The flanges are provided with connections (81) for the supply and removal of the mixture to be separated.

In a further preferred embodiment cover plates 10, 10' are integrated into gasket 20. This is especially preferred when cover plates 10,10' are made of stainless steel and gasket 20 of graphite.

In a further preferred embodiment stainless steel is used as the material for the perforated plates 55,57 with a thickness between 0.2 to 5 mm, preferentially 0.5 to 1 mm.

In a further preferred embodiment stainless steel metal fabric is used as a spacer 56, with a maximum free cross section. Thickness of the spacer fabric 56 is 0.5 to 5 mm, preferentially 1.5 to 3 mm. The shape and arrangement of the metal fabric has to be chosen in such a way that no deformation by compression between the sides of the fabric will occur.

In a further preferred embodiment perforated plate 55,57 and spacer 56 are combined into one unit (permeate compartment, see no 50, FIG. 3).

In a further preferred embodiment rings 60,60' are made from stainless steel.

In a preferred application of the plate module of the invention at least one module is arranged in a vessel which can be evacuated. The vessel is provides with means to keep it under vacuum, means for supply and removal of the mixture to be separated to and from the module and means for condensation of the permeated vapor emanating from the module.

We claim:

1. An apparatus for the separation of fluid mixtures into a retentate and a permeate, comprising:
    a feed plate having two opposite major planar surfaces and two opposite sides each having at least one opening, each said opening of said feed plate being connected to at least one distribution duct with outlets formed in a said major planar surface;
    a cover plate respectively covering a said distribution duct on each of said major planar surfaces of said feed plate, said cover plates each comprising at least one opening which coincides with said openings of said feed plate, said cover plates not covering said outlets;
    a gasket being positioned on each of said major planar surfaces of said feed plate, the outer dimensions of said gaskets coinciding with the outer dimensions of said feed plate, and the inner dimensions of said gaskets coinciding with the inner dimensions of said cover plates at those sides where said gaskets are covering said cover plates, each said gasket including openings coinciding with said openings of said feed plate and said cover plates;
    a membrane having a feed surface and a permeate surface, the feed surface of each said membrane facing a major planar surface of said feed plate, said gasket being interposed between said feed surface and the major planar surface of the feed plate to form a feed compartment between said feed surface and said major planar surface, each said membrane having openings concentrical to said openings of said feed plate, said openings of said cover plates, and said openings of said gaskets, and said openings of said membranes having diameters larger than said openings of said feed plate, said cover plates, and said gaskets;
    a permeate compartment each comprising a first perforated plate, a second perforated plate, and a spacer interposed between said perforated plates, each said first and second perforated plates and said interposed spacer having openings coinciding with said openings of said membranes;
    a ring in each of the coinciding openings of said perforated plates and said spacer and said openings of said membranes, the outer diameters of said rings equalling the diameters of said openings of said membranes, said perforated plates and said spacers, and the inner diameters of said rings equalling diameters of the coinciding openings of said feed plate, said openings of said cover plates, and said openings of said gaskets, wherein said rings are contacting said gaskets;
    each said ring having a thickness equalling the sum of the thicknesses of said permeate compartment formed by said perforated plates and said interposed spacer, plus two times the thickness of one said membrane;
    at least one supply duct and at least one removal duct each being formed by an inner lumen of said rings, said rings leading through said permeate compartments and being sealed against said permeate compartments, said supply and removal ducts being connected via said distribution ducts and said outlets with the interior of said feed compartment;
    said gasket sealing said feed surfaces of said membranes as well as said supply and removal ducts against said permeate compartments; and,
    a drainage fabric adjacent said permeate side of each said membrane, said drainage fabrics having outer shape dimensions equalling those of said membrane, and openings equalling and coinciding with openings of said membranes, each said drainage fabric being interposed between said permeate surface of one said membrane and one said perforated plate of said permeate compartment; whereby said permeate exits said permeate compartments through open peripheral edges of said spacers.

2. Apparatus according to claim 1 comprising a multiplicity of feed compartments (90) and permeate compartments (50) alternatingly arranged in a stack, held together by set bolts and flanges (80), said flanges being provided with connections (81) for supply and removal of the mixture to be separated.

3. Apparatus according to claim 1 or 2, wherein said feed plates (1), cover plates (10, 10'), perforated plates (55, 57), and spacers (56) are made from materials selected from the group consisting of metal, plastic, ceramics, and graphite.

4. Apparatus according to claim 1 or 2, wherein said gaskets (20) are made from an elastomer.

5. Apparatus according to claim 1 or 2, wherein said cover plates (10, 10') are an integral part of the said gasket (20).

6. Apparatus according to claim 1 or 2, comprising limiters which limit the compression of said gasket (20).

7. A method of separating fluid mixtures by pervaporation or vapor permeation comprising the steps of providing an apparatus according to claim 1, including a said membrane capable of separating said fluid mixture by pervaporation or vapor permeation, feeding mixed fluids into said at least one feed compartment (50), passing one of said fluids through said membranes as a permeate (30) and into said permeate compartments, removing said permeate from said permeate compartments.

* * * * *